United States Patent [19]

Odaka

[11] 4,284,975
[45] Aug. 18, 1981

[54] ON-LINE PATTERN RECOGNITION SYSTEM FOR HAND-WRITTEN CHARACTERS

[75] Inventor: Kazumi Odaka, Tokorozawa, Japan

[73] Assignee: Nippon Telegraph & Telephone Public Corp., Tokyo, Japan

[21] Appl. No.: 98,813

[22] Filed: Nov. 30, 1979

[30] Foreign Application Priority Data

Dec. 12, 1978 [JP] Japan .................................. 53/153999

[51] Int. Cl.³ ................................................ G06K 9/62
[52] U.S. Cl. ...................... 340/146.3 J; 340/146.3 SY
[58] Field of Search ............... 340/146.3 AC, 146.3 J, 340/146.3 SY

[56] References Cited

U.S. PATENT DOCUMENTS

| | | | |
|---|---|---|---|
| 3,300,757 | 1/1967 | Beltz | 340/146.3 J |
| 3,605,093 | 9/1971 | Parks et al. | 340/146.3 J |
| 3,676,847 | 7/1972 | Partin | 340/146.3 AC |
| 4,180,799 | 12/1979 | Smith | 340/146.3 AC |

OTHER PUBLICATIONS

Arakawa et al., "On-Line Rec. of Handwritten Char.", *Review of El. Comm. Laboratories*, vol. 26, Nos. 11-12, Nov.–Dec. 1978, pp. 1521-1536.

Groner et al., "On-Line Comp. Class of Handprinted Chinese Char.", *IEEE Trans. on El. Computers*, Dec. 1967, pp. 856-860.

*Primary Examiner*—Leo H. Boudreau
*Attorney, Agent, or Firm*—Armstrong, Nikaido, Marmelstein & Kubovcik

[57] ABSTRACT

A pattern recognition system operating on an on-line basis for hand-written characters, in particular for hand-written Chinese characters comprises a character input unit for providing the coordinates of a plurality of points on the strokes of a written input character, a classification unit for classifying the input characters to the first group having equal to or less than three strokes, and the second group having equal to or more than four strokes, an approximate unit for providing a plurality of feature points to each of strokes, the number of strokes being six for each stroke in the first group of characters and three for each stroke in the second group of characters, a pattern difference calculator for providing the sum of the length between the feature points of the input character and those of the reference characters which are stored in the reference pattern storage, and a minimum difference detector for determining the minimum length among the pattern differences thus calculated. The input character is recognized to be the same as the reference character which provides said minimum length.

4 Claims, 8 Drawing Figures

ON-LINE PATTERN RECOGNITION SYSTEM FOR HAND-WRITTEN CHARACTERS

BACKGROUND OF THE INVENTION

The present invention relates to a pattern recognition system for a hand-written character, in particular, relates to such a system which operates in a real-time on-line condition, and recognizes correctly both a simple character and a complicated character having both straight strokes and curved strokes.

There have been known three systems as an on-line pattern recognition system.

The first prior system derives a pair of linear waveforms which is obtained by converting the movement of a hand-written point to rectangular coordinates, and takes an approximation of said linear waveforms through a rectangular function expansion, and recognizes a character by utilizing a coefficient of the rectangular function, (for instance, "On-Line recognition of Handwritten Characters" by Hiroki Arakawa et al, Review of the Electrical Communication Laboratories Vol. 26, Nos. 11-12 November-December, 1978).

The second prior system approximates the strokes of the character to be recognized to a string of vectors, which have eight quantized directions, and classifies the approximated strokes to some fundamental strokes, and recognizes the character by the combination of the fundamental strokes, (for instance, IEEE Transactions on Electronic Computers, December 1967, pages 856–860).

The third prior system classifies the strokes which compose the character to some fundamental strokes, and provides a feature table which describes the character by the end points and/or the cross points of the strokes, and recognizes the input character by comparing the input character with the feature table.

However, the above prior arts have the disadvantages described below.

The first system has the disadvantages that the approximation by the rectangular function is not sufficiently correct for those characters like Chinese characters and/or Japanese alphabet characters which have many straight line components, and the feature in view of the phase of the character is not recognized enough. Therefore, the recognition ratio of this system has not been satisfactory.

The second system has the disadvantages that the classification of the input strokes to the fundamental strokes are not correct enough, and so the recognition ratio is not satisfactory. Further, it takes additional labor to describe the characters to be recognized in detail.

The third system has the disadvantages that the error of the classification of the fundamental strokes provides the decrease of the recognition ratio, as in the case of the second prior system, and it takes additional labor to prepare the feature table for all the characters, and further, a large memory is required to store that feature memory.

SUMMARY OF THE INVENTION

It is an object of the present invention, therefore, to overcome the disadvantages and limitations of prior pattern recognition systems by providing a new and improved pattern recognition system.

Another object of the present invention is to provide a pattern recognition system, which can recognize both the characters having curved strokes and those having straight strokes with a simple apparatus.

The above and other objects are attained by the pattern recognition system for hand-written characters operating on an on-line basis comprising a character input unit for providing the coordinates of a plurality of points on strokes of a hand-written input character, an approximate unit for providing some feature points for each stroke of the input character, a pattern difference calculator for providing the sum of the length between the feature points of the input character and those of the reference characters which are stored in the reference pattern storage, and a minimum difference detector for determining the minimum value of the difference among the pattern differences thus calculated and determining the input character as the reference character which provides the minimum difference.

BRIEF DESCRIPTION OF THE DRAWINGS

The foregoing and other objects features, and attendant advantages of the present invention will be appreciated as the same become better understood by means of the following description and accompanying drawings wherein.

DESCRIPTION OF THE PREFERRED EMBODIMENTS

Figure 1:
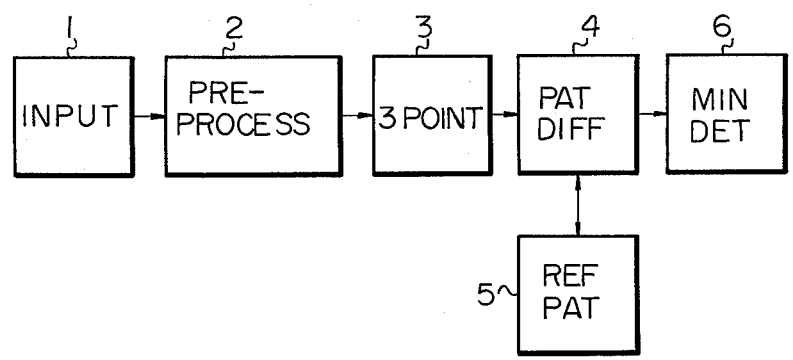
FIG. 1 is the brief block diagram of the present character recognition system.
Figure 2:
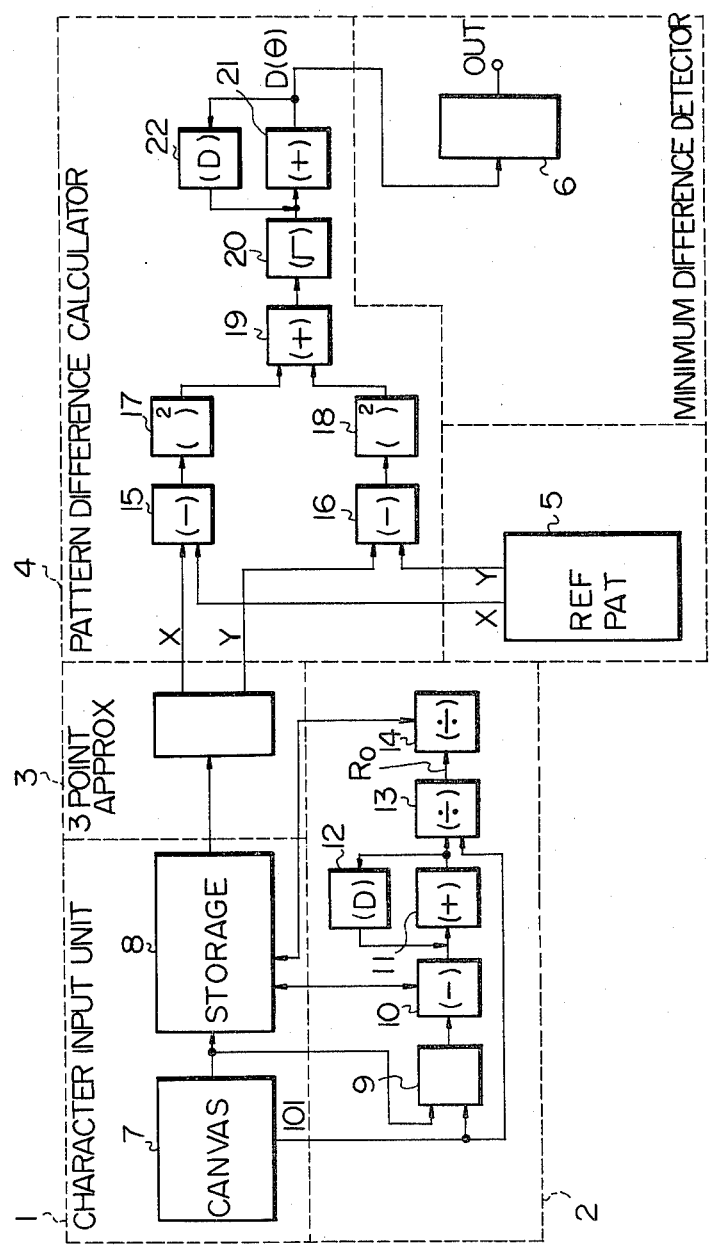
FIG. 2 is the detailed block diagram of the apparatus shown in FIG. 1.

FIG. 1 shows the brief block-diagram of the first embodiment of the present pattern recognition system, and FIG. 2 is the detailed block-diagram of the same. In the figures, the reference numeral 1 is the character input unit, 2 is the pre-process unit, 3 is the three points approximation unit, 4 is the pattern difference calculator, 5 is the reference pattern storage, and 6 is the minimum difference detector.

The character input unit has the canvas 7 and the storage 8. When we write a character on the canvas 7, the x- and y- coordinates of the pen $(X_i, Y_i)$ $(i=1,2,3 \ldots n$, and n is the number of sampling points) are provided by said canvas 7 in every predetermined length of the movement of the pen, and said coordinates are stored in the storage 8. Also, when we complete the writing of each character, the number (n) of the sampled coordinates in the character is provided on the character end signal line 101. The example of said character input unit is commercially purchased as the type 4953/4954 graphic tablet manufactured by Sony-Techtronics Co., Ltd. in Tokyo, Japan, or the grafacon (model 1010A/2020) manufactured by Communication Science Corporation in Tokyo, Japan.

Next, the center of the character is calculated by the center calculator 9 in the pre-process unit 2. The center coordinates are obtained separately for each X coordinate and Y coordinate. The X-coordinate of the center $(\overline{X})$ is obtained by summing up all the X-coordinates $(X_1, X_2, X_3 \ldots X_n)$ of the sampled points, and dividing the sum by the sampled number (n) on the line 101. That is to say, the X-coordinate $(\overline{X})$ of the center is obtained by the formula below.

$$\overline{X} = (1/n) \sum_{i=1}^{n} X_i$$

Similarly, the Y-coordinate $(\overline{Y})$ of the center is obtained by the formula;

$$\overline{Y} = (1/n) \sum_{i=1}^{n} Y_i$$

Thus, the coordinates of the center of the character $(G = (\overline{X}, \overline{Y}))$ are obtained.

The subtractor 10 converts the coordinates stored in the storage 8 to the coordinates with the origin G which is the center thus obtained. The conversion is performed by subtracting $\overline{X}$ from each X-coordinates in the storage 8, and subtracting $\overline{Y}$ from each Y-coordinates in the storage. The converted coordinates replace the contents of the storage 8. At the same time, the length $(R_i)$ between each converted coordinates and the origin (G) is applied to the adder 11. Said length $(R_i)$ for all the sampled points is accumulated by utilizing said adder 11 and the delay circuit 12. The divider 13 divides the accumulated length by the sampled number (n), and provides the mean radius $(R_O)$ of the character as follows;

$$R_O = (1/n) \sum_{i=1}^{n} R_i$$

Another divider 14 normalizes the size of the character by dividing each of the converted coordinates (X, Y) in the storage 8 by said mean radius $(R_O)$. Thus, the pre-process is finished, and the size and the center of the input character are normalized.

The three points approximation unit 3 takes three coordinates which are just normalized from all the sampled coordinates for each stroke. Those three points are for instance the initial point of the stroke, the center point of the stroke and the end point of the stroke, and the feature of the stroke is represented by those three points. Therefore, those three points are called as feature points. The coordinates of those three points are applied to the pattern difference calculator 4 in every predetermined duration.

Figure 3:
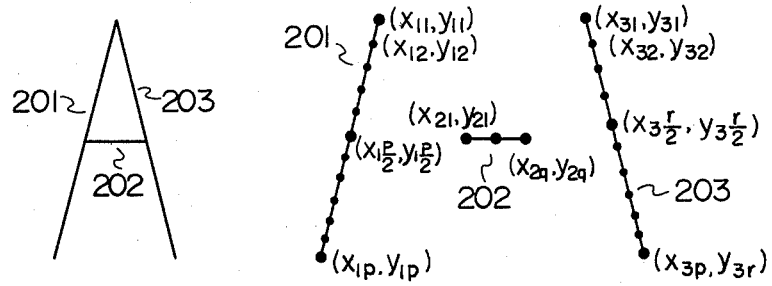
FIG. 3 shows the example of the character to be recognized for the explanation of the operation of the present invention.

FIG. 3 shows the example of the three points approximation. Assuming that the pattern of the input character is "A" having three strokes 201, 202 and 203, then the coordinates of a plurality points on the first stroke 201 are $(x_{11}, y_{11}), (x_{12}, y_{12}), \ldots (x_{1p}, y_{1p})$, the coordinates of the second stroke 202 are $(x_{21}, y_{21}) \ldots (x_{2q}, y_{2q})$, and the coordinates of the third stroke are $(x_{31}, y_{31}) \ldots (x_{3r}, y_{3r})$. The three points approximation unit picks up three points from the coordinates on each stroke. Then, the feature points on the first stroke 201 are $(x_{11}, y_{11})$ which is the initial point of the stroke, $(x_{1,p/2}, y_{1,p/2})$ which is the center point of the stroke. When the value p/2 is not an integer, the coordinates closest to the center is picked up as a center point. The third feature point on the first stroke 201 is $(x_{1p}, y_{1p})$. Similarly, the feature points on the second stroke 202 are $(x_{21}, y_{21})$, $(x_{2\,q/2}, y_{2\,q/2})$ and $(x_{2q}, y_{2q})$. The feature points on the third stroke 203 are $(x_{31}, y_{31})$, $(x_{3\,r/2}, y_{3\,r/2})$, and $(x_{3r}, y_{3r})$. Each stroke is represented by those three feature points, which are stored in the storage 8.

The pattern difference calculator 4 calculates the length or the difference between the feature points of the character to be recognized and the feature points of each of reference character by using the following formula.

$$D(\theta) = \sum_{k=1}^{M} \sqrt{(X_k - X_k^\theta)^2 + (Y_k - Y_k^\theta)^2} \quad (1)$$

where $D(\theta)$ is the length between the input character to be recognized and the $\theta$'th reference characters, $(X_k, Y_k)$ is the coordinates of the feature points which have three samples for each stroke of the input character, and (k) has the range from 1 to M, where M=3m, m is the number of the strokes. Also, $(X_k^\theta, Y_k^\theta)$ is the coordinates of the reference character which is stored in the reference pattern storage 5, and $\theta$ has the range from 1 to $\theta$, and $\theta$ is the number of characters to be recognized (when only an alphabet is to be recognized, $\theta=26$).

In order to calculate the pattern length, the subtractor 15 in FIG. 2 provides the difference $(X_k - X_k^\theta)$ between the X-coordinate of the written input character and the X-coordinate of the $\theta$'th reference pattern, and the square circuit 17 provides $(X_k - X_k^\theta)^2$. Similarly, the subtractor 16 and the square circuit 18 provide the value $(Y_k - Y_k^\theta)^2$ relating to Y-coordinate. The adder 19 provides the sum of those two squares, and the root circuit 20 provides the square root of the sum provided by said adder 19. The above calculation is repeated by M times, where M is the total number of the feature points of all the strokes. And the output of the square root circuit 20 is accumulated by M times by utilizing the adder 21 and the delay circuit 22. Thus, the pattern length $D(\theta)$ is obtained at the output of the adder 21.

Said pattern length $D(\theta)$ is calculated for each reference pattern, and so ($\theta$) number of pattern lengths $D(\theta)$ are obtained. Those values of the pattern length are applied to the minimum difference detector 6, which compares the first pattern difference $D(1)$ with the second pattern difference $D(2)$, and outputs the smaller one. Also, the detector compares that smaller pattern difference with the third pattern difference $D(3)$ and outputs the smaller one. By repeating this process, the detector 6 provides the minimum pattern difference $D(\theta_{min})$, and the input character is recognized as $\theta_{min}$.

According to the modification of the pattern recognition system in FIGS. 1 and 2, the pattern difference is calculated by introducing the variance of the coordinates as follows.

$$D(\theta) = \sum_{k=1}^{M} \sqrt{\frac{(X_k - X_k^\theta)^2}{\sigma^2_{kx\theta}} + \frac{(Y_k - Y_k^\theta)^2}{\sigma^2_{ky\theta}}} \quad (2)$$

where $\sigma^2_{kx\theta}$ and $\sigma^2_{ky\theta}$ are variance of $X_k^\theta$ and $Y_k^\theta$, respectively.

Figure 4:
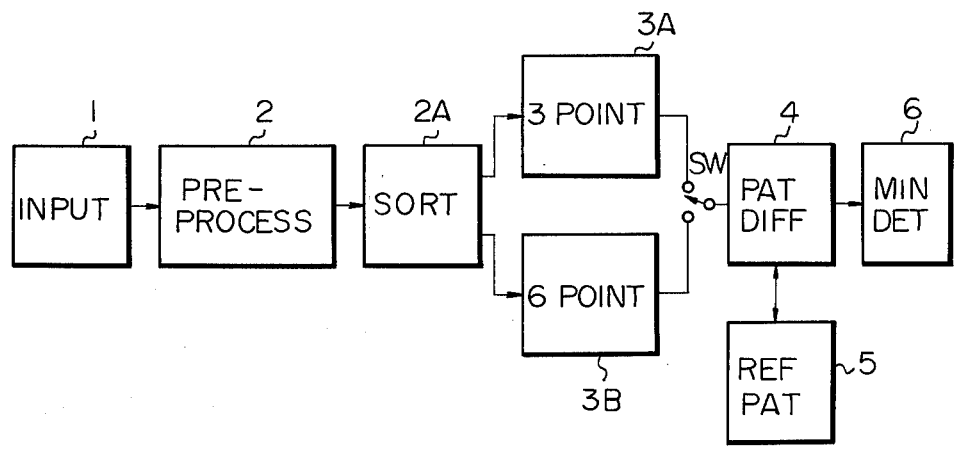
FIG. 4 is the brief block diagram of another embodiment of the present character recognition system.

FIG. 4 is the block-diagram of another embodiment of the present character recognition system. In the figure, the reference numerals 1, 2, 4, 5 and 6 show the same members as those of the same reference numerals in FIG. 1. The 2A is the character sorting unit which sorts the characters according to the number of strokes of each character, 3A is the three points approximation unit, and 3B is the six points approximation unit.

In FIG. 4, the character input unit 1 provides the X-coordinate and the Y-coordinate of a hand-written character, as is the case in FIG. 1. Those coordinates are normalized by the pre-process unit 2. The character sorting unit 2A classifies the characters into the groups, that is to say, when the input character is equal to or more than four strokes, that character is classified to the first group and is applied to the three points approximation unit 3A, which approximates each stroke by providing three coordinates for the initial point, the center point, and the end point. While, when the input character has equal to or less than three strokes, that character is classified to the second group and is applied to the six points approximation unit 3B, which approximates each stroke by providing six coordinates along the stroke. The six approximation points are, for instance, the initial point, the end point and each grid point of the five divided stroke. Accordingly, when the number (n) of the strokes of the input character is equal to or more than four, that character is indicated by 3n number of feature points, while when the number of strokes of the input character is equal to or less than three, that character is indicated by 6n number of feature points.

Figure 7A:
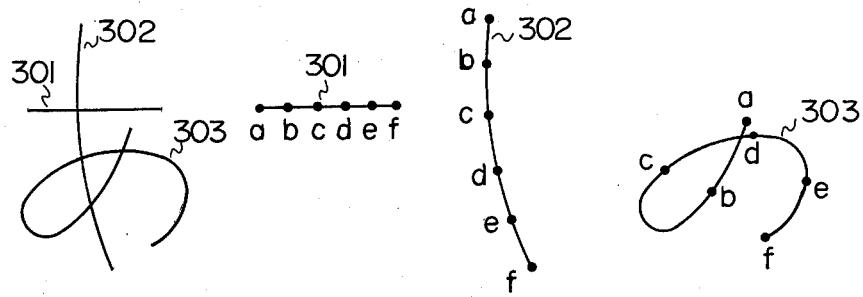
FIG. 7A and FIG. 7B show the examples of the characters to be recognized for the explanation of the operation of the present invention.
Figure 7B:
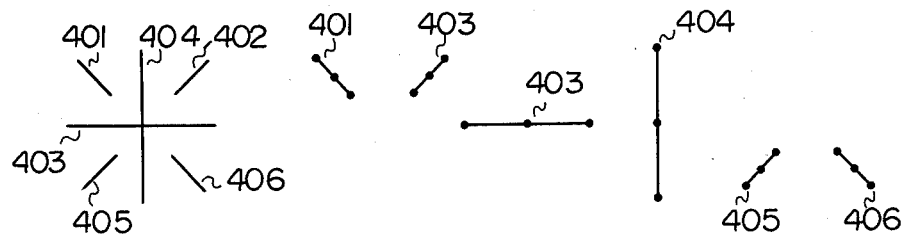

FIGS. 7A and 7B show the examples of the classification of an input character. The pattern in FIG. 7A has three strokes 301, 302 and 303 and so that pattern is classified to the first group. Then each of the strokes of that pattern have six feature points (a~f) as shown in the FIG. 7A. While the pattern in FIG. 7B has six strokes 401 through 406, then that pattern is classified to the second group, and each of the strokes has three feature points as shown in FIG. 7B.

The outputs of those three or six points approximation units are applied to the pattern difference calculator 4 through the switch SW. Said pattern difference calculator 4 calculates the difference between feature points of the input character and the feature points of a reference character from the reference character storage 5 as in the case of FIG. 1, except that the calculation is switched to three points or six points according to the outputs of the approximation units 3A or 3B, respectively. And the minimum difference detector 6 provides the recognized character.

The embodiment in FIG. 4 has the advantage that the input character is classified to a plurality of groups according to the number of strokes of the character, and so those characters having curved strokes can have many approximation points, while a straight stroke is approximated by a few points. Therefore, a stroke of those characters having curved strokes like numeric characters and/or hand-written characters, is approximated by many points, and a stroke of those characters having only straight strokes like Chinese characters, is approximated by a few points. Accordingly, curved characters are recognized correctly, and the complicated characters having many straight line strokes do not request the large capacity of the storage for the feature points.

Although the boarder line of the number of the strokes is three in the above embodiment, another alternatives are of course possible, like two, four or five. And the number of feature points is also selected from other than said embodiment.

Figure 5:
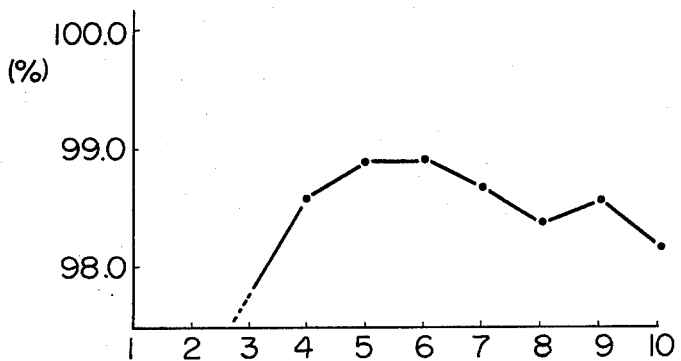
FIG. 5 shows the curve showing the experimental result of the test of the present character recognition system.

FIG. 5 shows the experimental result showing the curve between the number of feature points in each stroke (horizontal axis) and the recognition ratio for the characters (vertical axis) having equal to or less than three strokes in Japanese cursive syllabaly characters (Hiragana), where the recognition ratio is the ratio of the number of characters recognized correctly to the total number of tested characters. Each reference character is prepared by taking the average of the coordinates of 80 hand-written characters, and 30 hand-written characters were tested for each category (character). It should be appreciated from that curve that the proper number of the feature points is six for each stroke as far as Japanese alphabetic characters (Japanese cursive syllabary) which are mainly composed of curved lines concern. Also, it should be noted that four feature points or five feature points for each stroke can provide the satisfactory recognition ratio. Accordingly, if characters are classified according to the number of strokes by determining the predetermined number of strokes into a plurality of groups, and each stroke of characters in each group are sampled by the plurality of feature points the number of which is defined for each group, the efficient pattern recognition system in which many feature points are utilized for complicated curved strokes and a few feature points are utilized for simple straight strokes, is obtained.

Figure 6:
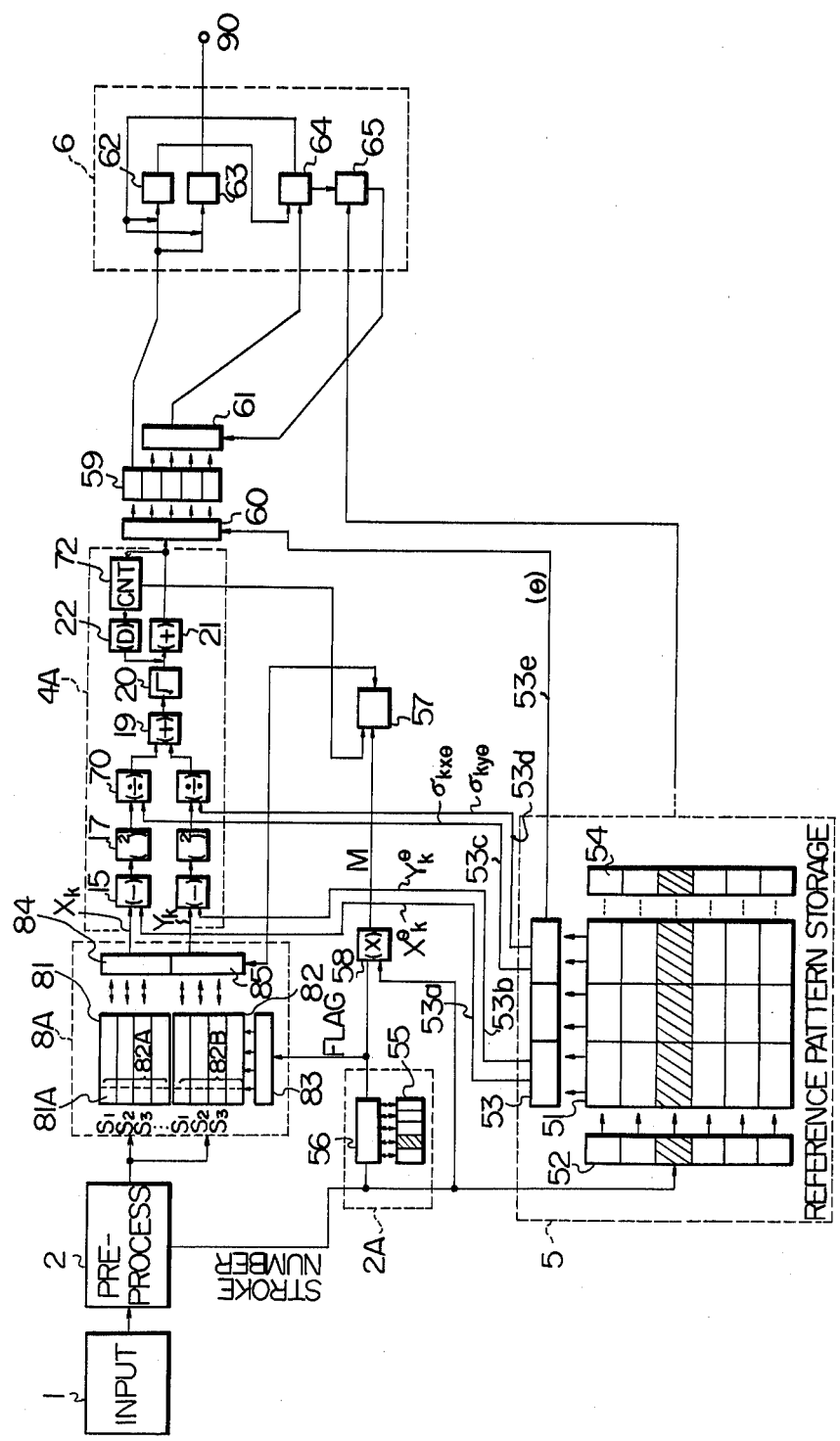
FIG. 6 is the block diagram of still another embodiment of the present character recognition system.

FIG. 6 shows the block diagram of another embodiment of the present character recognition system.

The apparatus in FIG. 6 has the feature that the number of the feature points in each stroke can be selected according to the number of the strokes of the input character.

In FIG. 6, an input character is read by the character input unit 1, and is processed by the pre-process unit 2. The outputs of the pre-process unit 2, that is to say, the coordinates of the points in each stroke are stored in the memory area 82 of the strage 8A. In this case, the X-coordinates of each stroke are stored in the area 82A, and Y-coordinates of each stroke are stored in the area 82B, in sequence. At the same time, the information concerning the number of strokes of the input character is applied to the feature number table 2A, which is embodied by an ordinary digital memory and has a memory area 55 and the read-write unit 56. The memory area 55 stores the table which gives the number of the feature points in each stroke according to the number of the strokes of input characters. The example of the table of the memory 55 is shown below.

| Number of strokes | Number of feature points in each stroke |
|---|---|
| 1 | 6 |
| 2 | 6 |
| 3 | 5 |
| 4 | 3 |
| 5 | 3 |
| more than 6 | 2 |

The output of the feature number table 2A is applied to the storage 8A, and write a flag to the coordinates of the feature points in the area 82A and 82B through the writing unit 83. For instance, when the number of the feature points is three, three coordinates (the first point, the center point, and the end point in the stroke in the storage 8A) are given flags, in order to indicate that the flagged coordinates or points are feature points.

The multiplicator 58 receives the output of the feature number table 2A which indicate the number of feature points in each stroke, and the number of strokes from the pre-processor 2. Accordingly, the product provided by the multiplicator 58 indicates the number of the feature points in all the strokes in the input character.

The reference pattern storage 5 has the first storage 51, which stores the X-coordinate, Y-coordinate, X-variance, and Y-variance of each reference character, and the second storage 54 which stores the number of characters with the specified strokes. For instance, when there are 100 characters which have three strokes, then, the content of the third address of the second storage is 100. The area of the first storage 51 is classified by the number of strokes, and when the pre-processor 2 applies the signal indicating the number of strokes, the addressing unit 52 triggers the area of said number of strokes in the first storage 51. Then, each of the coordinates and variances of the characters in said area of the specified number of strokes are read out by the read out unit 53 in sequence. The read out unit 53 provides five signals on the lines 53a through 53e. On the lines 53a and 53b, the X-coordinate and the Y-coordinate of a reference character are provided, respectively, on the lines 53c and 53d the X-variance and the Y-variance of the character are provided, and on the line 53e the information which the number of a reference character being read is provided. For instance, when the first character in the area storing the specified strokes is being read and the coordinates and the variances of said first character are on the lines 53a through 53d, then, the number (one) indicating the first character is provided on the line 53e.

The X- and Y- coordinates on the lines 53a and 53b are applied to the first inputs of the subtractors 15 and 16 of the pattern difference calculator 4A, respectively, and the X- and Y- variances on the lines 53c and 53d are applied to the first inputs of the dividers 70 and 71, respectively. Also, the read out unit 84 of the storage 8A reads only the flagged information in the area 82A and the area 82B, and applies to the flagged information of the second inputs of the subtracters 15 and 16x, respectively.

The pattern difference calculator 4A provides the difference $D(\theta)$ between the input character and each of the reference characters having the same number of strokes as that of the input character according to the following formula which is the same as the formula (2).

$$D(\theta) = \sum_{k=1}^{M} \sqrt{\frac{(X_k - X_k^\theta)^2}{\sigma_{kx\theta}^2} + \frac{(Y_k - Y_k^\theta)^2}{\sigma_{ky\theta}^2}}$$

When the first feature point ($k=1$) of the $\theta$'th character which has the specified number of strokes is to be calculated, $X_1$ and $Y_1$ of the input character are applied to the first inputs of the subtracters 15 and 16, and $X_1^\theta$ and $Y_1^\theta$ which are the first feature point of the $\theta$'th reference character are applied to the second inputs of the subtracters 15 and 16, respectively. Also, the variances $\sigma_1^2 x\theta$ and $\sigma_1^2 y\theta$ are applied to the dividers 70 and 71, respectively. Utilizing that information, the subtracters 15 and 16, the square circuits 17 and 18, the dividers 70 and 71, the adder 19 and the square root circuit 20 performs the following calculation.

$$\sqrt{\frac{(X_1 - X_1^\theta)^2}{\sigma_{1x\theta}^2} + \frac{(Y_1 - Y_1^\theta)^2}{\sigma_{1y\theta}^2}}$$

The same calculation is performed for another values of (k), and the difference of the k'th feature point between the input character and the $\theta$'th reference character is obtained at the output of the square root circuit 20. The outputs of said square root circuit 20 are accumulated utilizing the adder 21, the delay circuit 22 and the counter 72, as in the case of FIG. 2, where the delay circuit 22 delays the output of the adder 21 by the time requested for the calculation of the difference of the next feature point. When the calculation process is repeated by (M) times, the content of the counter 72 reaches (M), where (M) is the total number of the feature points of the input character. At this time it should be noted that the multiplicator 58 provides the value (M) which is the total number of the feature points. Accordingly, the comparator 57 which receive the outputs of the counter 72 and the multiplicator 58 provides the coincidence output signal, which is applied to the read out unit 84 of the storage 8A, and then the calculation of the difference between the input character and the $\theta$'th reference character is finished. Then, the resultant difference $D(\theta)$ is stored in the $\theta$'th area of the digital type table memory 59 through the write-in unit 60.

Similarly, the difference between the input character and the next reference character (($\theta+1$)'th reference character) having the same strokes as that of $\theta$'th reference character is carried out, and the resultant difference $D(\theta+1)$ is stored in the ($\theta+1$)'th area of the table memory 59. In this case, the address ($\theta$) of the table memory 59 is given by the line 53e from the reference pattern storage 5.

When all the differences between the input character and the reference characters which have the same number of strokes as that of the input character are stored in the table memory 59, the minimum difference detector 6 searches the minimum value among the contents of the table memory 59.

In the minimum value detector, the reference numeral 62 is a minimum value storage, 63 is a recognized character storage, 64 is a comparator, and 65 is a counter. It should be noted that the counter 65 receives the output of the second storage 54 of the reference pattern storage 5 as the number of the reference characters with the specified number of strokes.

First, the first difference D(1) in the first area of the table memory 59 is applied to the minimum value storage 62, and the code of reference character is applied to the recognized character storage 63. Then, the second difference D(2) at the second area of the table memory 59 is read out by the read out unit 61, and the comparator 64 compares the first difference D(1) with the second difference D(2). The comparator 64 outputs the smaller difference, which substitutes the content of the minimum value storage 62 and the recognized character storage 63. The similar process is repeated by reading out the third difference D(3), the fourth difference D(4) et al, and the content of the counter 65 is added by one each time the process is repeated. When the process is repeated for all the differences stored in the table memory 59, the content of the counter 65 reaches the same value as the output of the storage 54 and said counter 65 provides the output signal, which is applied to the read out unit 61 to stop the operation of the minimum value detector 6. When the operation of the detector 6 is finished, it should be appreciated that the recognized character storage 63 provides the indication of the recognized character at the output terminal 90.

As explained above in detail, according to the present invention, the comparison of the input character with reference characters is carried out for only the sampled feature points, therefore, the calculation quantity of the present invention is considerably reduced compared with the prior art. Further, according to the preferred embodiment of the present invention, the number of the sampled points is switched according to the number of the strokes of an input character, then when an input character has less strokes the number of the sampling points (feature points) on each stroke is increased, while when an input character has many strokes the number of the sampling points (feature points) on each stroke is decreased. Therefore, a complicated character which has many strokes is expressed by a comparatively small number of feature points, and a simple character which has frequently some curved complicated strokes is expressed by a comparatively large number of feature points, and both the complicated characters and the simple characters can be recognized correctly with less quantity of the calculation process.

Accordingly, the present invention is beneficial to the application for the real-time and on-line character recognition system.

From the foregoing, it will now be apparent that a new and improved character recognition system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A pattern recognition system for hand-written characters operating on an on-line real-time basis comprising;
   (a) a character input unit for providing the coordinates of a plurality of points of a written character, and the number of said points,
   (b) pre-process unit for normalizing the size and the position of the written character,
   (c) a three points approximate unit for providing three feature points for each stroke of the character, said three feature points being the initial point, the center point and the end point of each stroke,
   (d) a pattern difference calculator for providing the sum of the length between the feature points of the input character and those of the reference characters,
   (e) a reference pattern storage for providing the coordinates of three feature points for each stroke of the reference characters, for the calculation of said pattern difference, and
   (f) a minimum difference detector for determining the minimum value among the pattern differences thus calculated and determining the input character as the reference character which has the minimum difference.

2. A pattern recognition system according to claim 1, wherein said pre-process unit also normalizes the length between each feature point and the center of the character, and said reference pattern storage stores the coordinates of the reference characters in the form that the length between each feature point and the center of the character is normalized.

3. A pattern recognition system for hand-written characters operating on an on-line real-time basis comprising;
   (a) a character input unit for providing the coordinates of a plurality of points of a written character and the number of said points,
   (b) pre-process unit for normalizing the size and the position of the written character,
   (c) a classification unit for classifying the characters into a first group of characters and a second group of characters according to the number of strokes that the character has,
   (d) a first approximate unit for providing the first number of feature points for each stroke for characters in the first group,
   (e) a second approximate unit for providing the second number of feature points for each stroke for characters in the second group, the second number of feature points being different from said first number of feature points,
   (f) a pattern difference calculator for providing the sum of the length between the feature points of the input character and those of the reference characters, and the number of those feature points being said first number or said second number,
   (g) a reference pattern storage for providing the coordinates of the feature points for each stroke of the reference characters for the calculation of said pattern difference, and
   (h) a minimum difference detector for determining the minimum value among the pattern differences thus calculated and determining the input characters as the reference character which has the minimum difference.

4. A pattern recognition system for hand-written characters operating on an on-line real-time basis comprising:
   (a) a character input unit for providing the coordinates of a plurality of points of a written input character and the number of the strokes that the input character has,
   (b) a pre-process unit for normalizing the size and the position of the written input character,
   (c) a first digital storage for storing the coordinates of the strokes of the input character from the output of said pre-processor,
   (d) a second digital storage having a feature table for providing the number of feature points in each stroke according to the number of the strokes of the input character,
   (e) means for providing a flag to the coordinates in said first digital storage, the number of the flags being specified by the content of the second storage,
   (f) a reference pattern storage for providing the coordinates of the feature points and the variances of the reference characters,
   (g) a pattern difference calculator for providing the difference between the feature points of the input character and each of reference characters,
   (h) a third digital storage for storing the differences thus calculated for each of the reference characters,
   (i) a minimum difference detector for determining the minimum value among the differences stored in the third storage, and recognizing the input character as the reference character which provides said minimum difference.

* * * * *